US012695974B2

(12) United States Patent
Yang et al.

(10) Patent No.: US 12,695,974 B2
(45) Date of Patent: Jul. 28, 2026

(54) IMAGING SYSTEM NODE LOCK DEPENDENCY DISCOVERY SYSTEMS AND METHODS

(71) Applicant: FLIR Commercial Systems, Inc., Goleta, CA (US)

(72) Inventors: Yu En Yang, Surrey (CA); Tzu Yeh Huang, Surrey (CA); Timothy Yat Tien Chan, Richmond (CA)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 560 days.

(21) Appl. No.: 17/508,903

(22) Filed: Oct. 22, 2021

(65) Prior Publication Data

US 2023/0132349 A1    Apr. 27, 2023

(51) Int. Cl.
| | |
|---|---|
| *H04N 23/617* | (2023.01) |
| *G06F 16/835* | (2019.01) |
| *G06F 16/838* | (2019.01) |
| *H04N 23/60* | (2023.01) |
| *H04N 23/62* | (2023.01) |

(52) U.S. Cl.
CPC ......... *H04N 23/617* (2023.01); *G06F 16/835* (2019.01); *G06F 16/838* (2019.01); *H04N 23/62* (2023.01); *H04N 23/64* (2023.01)

(58) Field of Classification Search
CPC ... G06F 16/838; G06F 16/835; H04N 23/617; H04N 23/64; H04N 23/62
See application file for complete search history.

(56) References Cited

U.S. PATENT DOCUMENTS

| | | | | |
|---|---|---|---|---|
| 5,655,148 A | * | 8/1997 | Richman | ............... G06F 13/102 710/9 |
| 6,052,720 A | * | 4/2000 | Traversat | .............. H04L 67/306 707/E17.012 |
| 6,161,125 A | * | 12/2000 | Traversat | ............ H04L 41/0856 709/200 |
| 6,910,068 B2 | * | 6/2005 | Zintel | ................. H04L 61/5092 709/225 |

(Continued)

OTHER PUBLICATIONS

Flir, "Feature Locking in Spinnaker API", Manual, May 2017, 8 pages, FLIR Integrated Imaging Solutions Inc., Wilsonville, Oregon, United States of America.

(Continued)

*Primary Examiner* — Charles Rones
*Assistant Examiner* — Huen Wong
(74) *Attorney, Agent, or Firm* — Haynes and Boone, LLP

(57) ABSTRACT

Various techniques are provided to generate a list of node names that cause a node in a machine vision camera to be locked. In one example, a method includes receiving a file identifying a plurality of nodes corresponding to features of a device, wherein each node has a plurality of settings and is configured to be in either an unlocked state to permit adjustment of its settings by a user or a locked state to prevent adjustment of its settings by the user; receiving a request by the user that identifies a first one of the nodes in the locked state; parsing at least a portion of the file to identify a second one of the nodes having associated settings which the locked state of the first node is contingent; and presenting those settings of the second node to the user. Additional methods and systems are also provided.

20 Claims, 11 Drawing Sheets

300

302 — Receive a file identifying a plurality of nodes corresponding to associated features of a device 304 — Receive a request by the user that identifies a first one of the nodes in the locked state 306 — Parse at least a portion of the file to identify a second one of the nodes having associated settings on which the locked state of the first node is contingent 308 — Present the associated settings of the second node to the user 310 — Receive a user adjustment of at least one of the associated settings of the second node 312 — Update the file to switch the first node from the locked state to the unlocked state in response to the user adjustment

(56)　　　　　References Cited

U.S. PATENT DOCUMENTS

| | | | |
|---|---|---|---|
| 6,941,521 B2 | 9/2005 | Lin et al. | |
| 7,437,434 B2 * | 10/2008 | Zintel | H04L 61/5014 |
| | | | 709/221 |
| 8,176,023 B2 * | 5/2012 | Graefe | G06F 16/2246 |
| | | | 707/704 |
| 8,290,977 B2 * | 10/2012 | Chinchwadkar | G06F 16/835 |
| | | | 707/778 |
| 11,012,612 B2 * | 5/2021 | Yamagami | H04N 23/80 |
| 12,045,375 B2 * | 7/2024 | Malladi | G06F 21/629 |
| 2002/0035579 A1 * | 3/2002 | Wang | G06F 16/84 |
| | | | 707/E17.121 |
| 2004/0230560 A1 | 11/2004 | Elza et al. | |
| 2004/0230903 A1 * | 11/2004 | Elza | G06F 40/143 |
| | | | 715/255 |
| 2005/0044367 A1 * | 2/2005 | Gasparini | G06F 21/121 |
| | | | 713/172 |
| 2005/0154751 A1 * | 7/2005 | Levi | G06Q 10/10 |
| | | | 707/999.102 |
| 2005/0198617 A1 | 9/2005 | Kim et al. | |
| 2006/0031427 A1 * | 2/2006 | Jain | H04L 67/125 |
| | | | 709/220 |
| 2006/0267857 A1 * | 11/2006 | Zhang | G06F 3/14 |
| | | | 345/1.1 |
| 2007/0096012 A1 * | 5/2007 | Voeller | H04L 67/12 |
| | | | 250/208.1 |
| 2008/0222261 A1 * | 9/2008 | Razdow | H04L 51/18 |
| | | | 709/206 |
| 2009/0203356 A1 * | 8/2009 | Li | H04L 67/125 |
| | | | 455/411 |
| 2010/0262443 A1 * | 10/2010 | D'Albis | G06Q 10/0637 |
| | | | 707/E17.005 |
| 2015/0039575 A1 * | 2/2015 | Helak | G06F 16/21 |
| | | | 707/696 |
| 2015/0180814 A1 * | 6/2015 | Razdow | H04L 51/18 |
| | | | 709/206 |
| 2015/0213150 A1 | 7/2015 | Ghaleb et al. | |
| 2016/0092462 A1 * | 3/2016 | Raj | G06Q 10/101 |
| | | | 707/704 |
| 2017/0365188 A1 * | 12/2017 | Dewhurst | G09B 21/007 |
| 2018/0067836 A1 * | 3/2018 | Apkon | G06F 8/34 |
| 2018/0075262 A1 * | 3/2018 | Auh | H04L 9/0643 |
| 2018/0268467 A1 * | 9/2018 | Labarre | G06F 16/9027 |
| 2019/0103966 A1 * | 4/2019 | Zimny | H04W 12/0433 |
| 2020/0320680 A1 * | 10/2020 | Yamagami | G06T 7/001 |
| 2020/0322525 A1 * | 10/2020 | Yamagami | H04N 23/617 |

OTHER PUBLICATIONS

Stemmer Imaging AG, "GenICam Features", GigE Vision Theory of Operation, Jan. 2020, 10 pages, Stemmer Imaging AG, Puchheim, Germany.

Möller et al., "GenApiTest", GenICam Tests, Jan. 2021, 20 pages, Basler Vision Technologies, Ahrensburg, Germany.

* cited by examiner

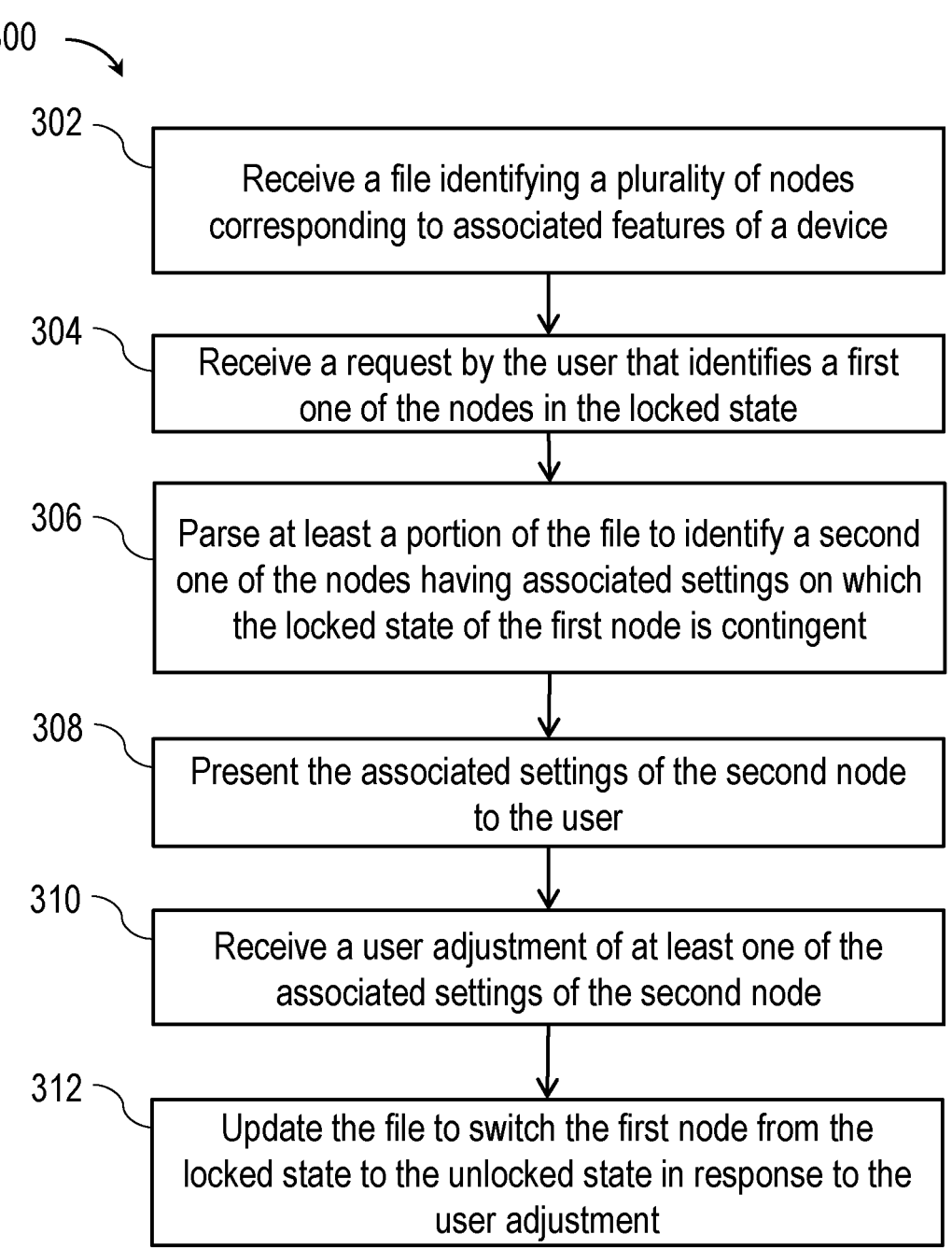

300

302 — Receive a file identifying a plurality of nodes corresponding to associated features of a device 304 — Receive a request by the user that identifies a first one of the nodes in the locked state 306 — Parse at least a portion of the file to identify a second one of the nodes having associated settings on which the locked state of the first node is contingent 308 — Present the associated settings of the second node to the user 310 — Receive a user adjustment of at least one of the associated settings of the second node 312 — Update the file to switch the first node from the locked state to the unlocked state in response to the user adjustment

FIG. 3

```
<?xml version="1.0"?>
<Command NameSpace="Standard" Name="TriggerSoftware">
    <ToolTip>Generates an internal trigger if Trigger Source is set to Software.</ToolTip>
    <Description>Generates an internal trigger if Trigger Source is set to Software.</Description>
    <DisplayName>Trigger Software</DisplayName>
    <Visibility>Beginner</Visibility>
    <pIsImplemented>TriggerSoftware_Imp</pIsImplemented>
    <pIsAvailable>TriggerSoftware_Avl</pIsAvailable>
    <pIsLocked>TriggerSoftware_Lck</pIsLocked>        ← 402
    <ImposedAccessMode>WO</ImposedAccessMode>
    <pValue>TriggerSoftware_Val</pValue>
    <CommandValue>1</CommandValue>
</Command>
```

FIG. 4

```
<MaskedIntReg Name="TriggerSoftware_Lck">
    <pAddress>TriggerSoftwareAddr</pAddress>
    <Length>4</Length>
    <AccessMode>RO</AccessMode>
    <pPort>Device</pPort>
    <pInvalidator>ExposureMode_Val</pInvalidator>        ← 502
    <pInvalidator>TriggerModeAll_Val</pInvalidator>        ← 504
    <pInvalidator>TriggerMode_Val</pInvalidator>        ← 506
    <pInvalidator>TriggerSource_Val</pInvalidator>        ← 508
    <pInvalidator>TriggerModeAcquisitionStart_Val</pInvalidator> ← 510
    <pInvalidator>TriggerModeFrameStart_Val</pInvalidator>        ← 512
    <pInvalidator>TriggerModeFrameBurstStart_Val</pInvalidator>   ← 514
    <Bit>3</Bit>
    <Sign>Unsigned</Sign>
    <Endianess>BigEndian</Endianess>
</MaskedIntReg>
```

FIG. 5

```
<?xml version="1.0"?>
<IntReg Name="TriggerModeAll_Val">
    <Address>0x000C8004</Address>
    <Length>4</Length>
    <AccessMode>RO</AccessMode>
    <pPort>Device</pPort>
    <pInvalidator>TriggerMode_Val</pInvalidator>              ← 602
    <pInvalidator>TriggerModeAcquisitionStart_Val</pInvalidator>   ← 604
    <pInvalidator>TriggerModeFrameStart_Val</pInvalidator>    ← 606
    <pInvalidator>TriggerModeFrameBurstStart_Val</pInvalidator> ← 608
    <pInvalidator>SequencerMode_Val</pInvalidator>            ← 610
    <pInvalidator>SequencerSetLoad_Val</pInvalidator>         ← 612
    <Sign>Unsigned</Sign>
    <Endianess>BigEndian</Endianess>
</IntReg>
```

FIG. 6

```
<?xml version="1.0"?>
<IntReg Name="TriggerMode_Val">
    <pAddress>TriggerModeAddr</pAddress>
    <Address>0x00000004</Address>
    <Length>4</Length>
    <AccessMode>RW</AccessMode>
    <pPort>Device</pPort>
    <Cachable>NoCache</Cachable>
    <pInvalidator>SensorShutterMode_Val</pInvalidator>       ← 702
    <pInvalidator>UserSetLoad_Val</pInvalidator>             ← 704
    <pInvalidator>SequencerMode_Val</pInvalidator>           ← 706
    <pInvalidator>SequencerSetLoad_Val</pInvalidator>        ← 708
    <Sign>Unsigned</Sign>
    <Endianess>BigEndian</Endianess>
</IntReg>
```

FIG. 7

```
<?xml version="1.0"?>
<Enumeration NameSpace="Standard" Name="TriggerMode">    ←~~~ 800
    <ToolTip>Controls whether or not trigger is active.</ToolTip>
    <Description>Controls whether or not trigger is active.</Description>
    <DisplayName>Trigger Mode</DisplayName>
    <Visibility>Beginner</Visibility>
    <pIsImplemented>TriggerMode_Imp</pIsImplemented>
    <pIsAvailable>TriggerMode_Avl</pIsAvailable>
    <pIsLocked>TriggerMode_Lck</pIsLocked>
    <ImposedAccessMode>RW</ImposedAccessMode>
    <EnumEntry NameSpace="Standard" Name="Off">
        <DisplayName>Off</DisplayName>
        <Value>0</Value>
    </EnumEntry><EnumEntry NameSpace="Standard" Name="On">
        <DisplayName>On</DisplayName>
        <Value>1</Value>
    </EnumEntry>
    <pValue>TriggerMode_Val</pValue>    ←~~~ 802
</Enumeration>
```

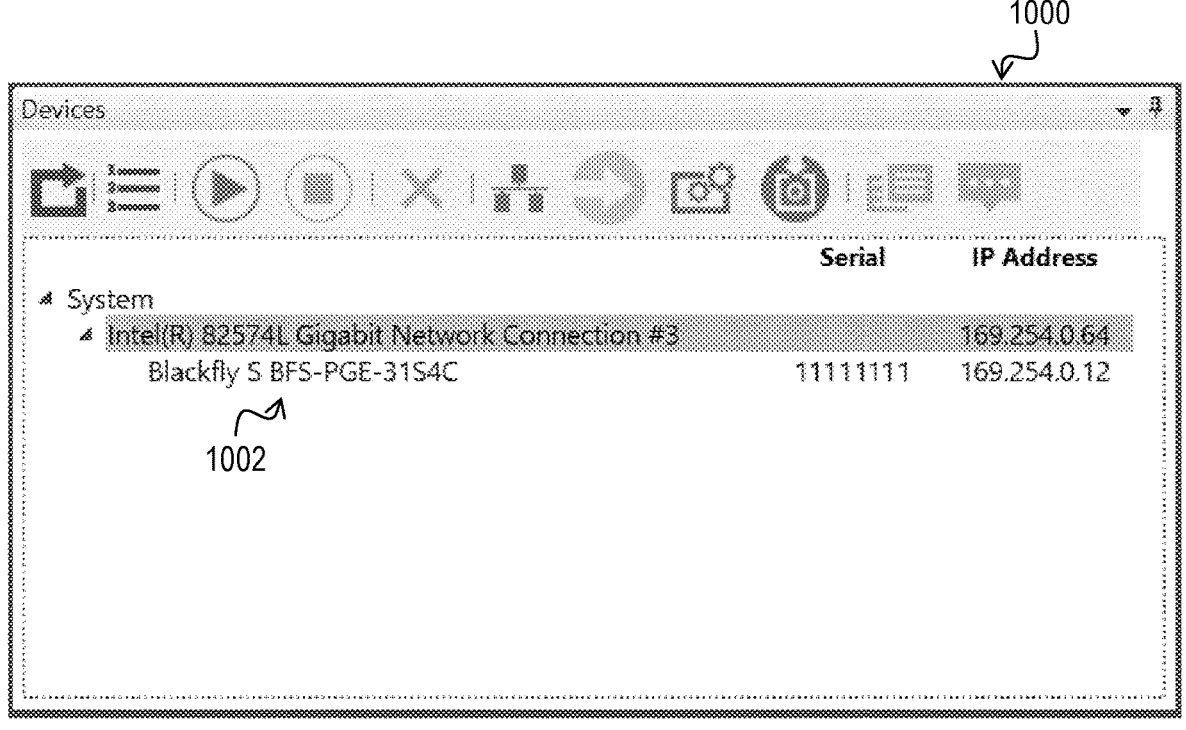

Devices

| | Serial | IP Address |
|---|---|---|
| ⊿ System | | |
| ⊿ Intel(R) 82574L Gigabit Network Connection #3 | | 169.254.0.64 |
| Blackfly S BFS-PGE-31S4C | 11111111 | 169.254.0.12 |

Blackfly S BFS-PGE-31S4C

⊙ Settings triggersoftware                                          ✕

☐ Search description area    ☑ Match whole search word    ☐ Match case

⊿ Blackfly S BFS-PGE-31S4C

⊿ Acquisition Control

Trigger Software                    Execute 1102                                                    1104

Trigger Software

Generates an internal trigger if Trigger Source is set to Software.

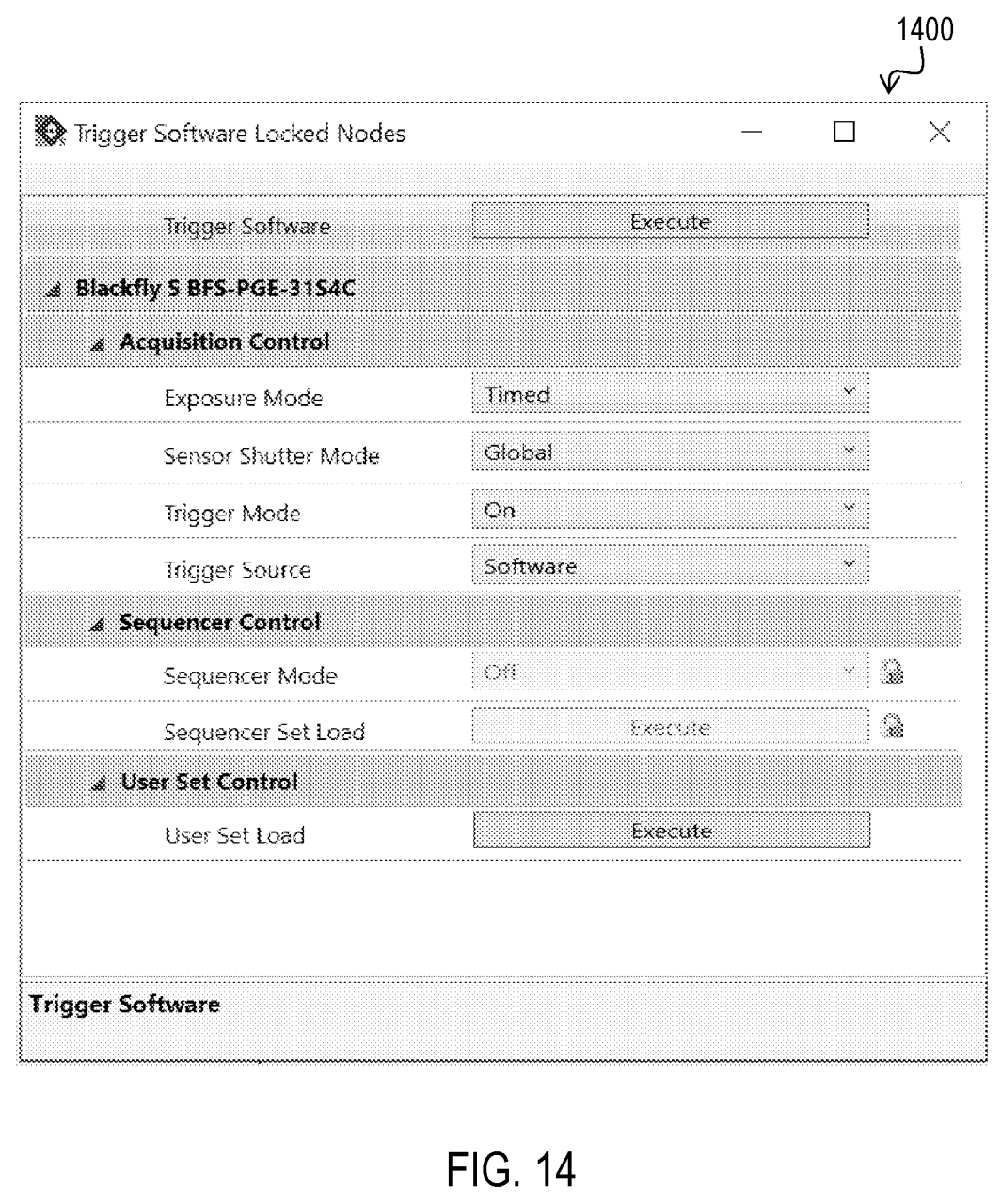

| Trigger Software Locked Nodes | — □ ✕ |

| Trigger Software | Execute |

⊿ Blackfly S BFS-PGE-31S4C

⊿ Acquisition Control

| Exposure Mode | Timed ⌄ |
| Sensor Shutter Mode | Global ⌄ |
| Trigger Mode | On ⌄ |
| Trigger Source | Software ⌄ |

⊿ Sequencer Control

| Sequencer Mode | Off ⌄ |
| Sequencer Set Load | Execute |

⊿ User Set Control

| User Set Load | Execute |

Trigger Software

FIG. 14

IMAGING SYSTEM NODE LOCK DEPENDENCY DISCOVERY SYSTEMS AND METHODS

TECHNICAL FIELD

The present invention relates generally to imaging systems and, more particularly, to user configuration of such systems.

BACKGROUND

Imaging systems (e.g., thermal cameras, visible light cameras, machine vision systems, and others) are often characterized by a vast number of features, settings, configurations, etc. that may be user adjustable. For example, users of imaging systems may be provided with a user interface to adjust one or more of the features to fit their desired application.

Many of these features affect or are affected by one another, commonly referred to as dependencies. Among these dependencies between features, the lock dependency is arguably the most difficult dependency to work with. For example, feature A has a lock dependency with feature B if there is a value that can be set on feature B which will cause feature A to be locked or no longer modifiable by the user (e.g., also referred to as locked, read only, or not available). For example, when the feature "Gamma Enable" is set to false, the feature "Gamma" can no longer be modified, thus the "Gamma" feature has a lock dependency with the "Gamma Enable" feature. Lock dependencies do not always appear intuitive like the example above. For example, the "Image Compression Mode" feature may be locked by the "Pixel Format" feature. Without the required domain knowledge, or insights into the implementation of a certain feature in some cases, it is very difficult for a user to discover why a feature of interest might be locked.

SUMMARY

Various techniques are disclosed to parse a file, such as a markup language file (e.g., Extensible Markup Language (XML), Hypertext Markup Language (HTML), Extensible HyperText Markup Language (XHTML), etc.) and, given a node of interest, output a list of nodes that potentially lock/unlock the given node. The embodiments are designed to assist users in quickly narrowing down nodes that are preventing the user from editing a feature of interest. The embodiments handle node relationships from simple, direct dependencies to complex, multi-layered chain dependencies while only outputting nodes that are meaningful to and accessible by the user.

In one embodiment, a method includes receiving a file identifying a plurality of nodes corresponding to associated features of a device, wherein each of the nodes has an associated plurality of settings and each of the nodes is configured to be in either an unlocked state to permit adjustment of its associated settings by a user or a locked state to prevent adjustment of its associated settings by the user; receiving a request by the user that identifies a first one of the nodes in the locked state; parsing at least a portion of the file to identify a second one of the nodes having associated settings on which the locked state of the first node is contingent; and presenting the associated settings of the second node to the user.

In another embodiment, a system includes a computer system configured to: receive a file identifying a plurality of nodes corresponding to associated features of a device, wherein each of the nodes has an associated plurality of settings and each of the nodes is configured to be in either an unlocked state to permit adjustment of its associated settings by a user or a locked state to prevent adjustment of its associated settings by the user; receive a request by the user that identifies a first one of the nodes in the locked state; parse at least a portion of the file to identify a second one of the nodes having associated settings on which the locked state of the first node is contingent; and present the associated settings of the second node to the user.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3 illustrates a flow diagram of a process for identifying settings of another node associated with features of an imaging system on which a locked state of the node associated with a given feature is contingent in accordance with an embodiment of the disclosure.

FIGS. 4-8 illustrate exemplary portions of markup language utilized in identifying nodes that could potentially lock and unlock the given feature in accordance with embodiments of the disclosure.

FIGS. 10-14 illustrate examples of graphical user interfaces in accordance with embodiments of the disclosure.

Figure 1:
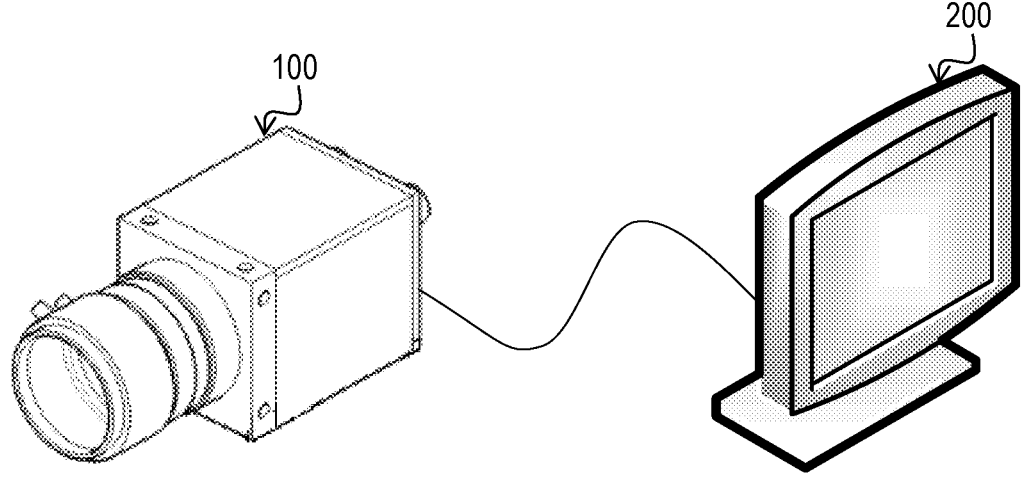
FIG. 1 illustrates an exemplary configuration of an imaging system coupled to a computer system in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology.

In one or more embodiments, various systems and methods are provided. In some aspects, such systems and methods may be used for thermal imaging, visible light imaging, machine vision imaging, and/or other applications (e.g., semiconductor production, food inspection, facial recognition, and vehicle collision avoidance, and/or others).

Imaging systems often include a large number of user adjustable features. While, typically, users of the machine vision systems are provided with a user interface to adjust one or more of the features to fit their desired application, many of these features have dependencies and figuring out which dependent feature causes a feature of interest to be locked is very difficult for a user to discover.

In some embodiments, an imaging system may maintain a file (e.g., a markup language file) that identifies a plurality of nodes corresponding to associated features of the imaging system. In this regard, each of the nodes may have an associated plurality of settings, and each of the nodes may be configured to be in either an unlocked state to permit adjustment of its associated settings by a user or a locked state to prevent adjustment of its associated settings by the user. Embodiments of the present disclosure provide techniques to parse such a file and, given a node of interest, output a list of settings associated with other nodes that potentially lock/unlock the given node. The embodiments are designed to assist users in quickly narrowing down nodes that are preventing the user from editing a feature of interest associated with he given node.

Turning now to the drawings, FIG. 1 illustrates an exemplary configuration of an imaging system 100 coupled to a computer system 200 in accordance with an embodiment of the disclosure. In various embodiments, imaging system 100 may be implemented as a device, such as a portable handheld camera system.

As shown, computer system 200 interfaces with imaging system 100 via an interface and, in some embodiments, may permit adjustment of many features of imaging system 100, such as auto-focus, field of view (FoV), brightness, contrast, gain, offset, spatial, temporal, and/or various other features and/or parameters. A user of computer system 200 may access imaging system 100 to adjust one or more features associated with imaging system 100. In adjusting the one or more features, the user may identify a feature that is locked and cannot be easily unlocked by the user. The cause for the feature being locked is not trivial for the user to discover. Users either need an understanding of the settings associated with that feature and their relationships, or the users need other industry specific or camera-implementation specific knowledge in order to know what settings to modify so as to unlock the changes to the feature.

That is, feature dependencies may be very complicated and very difficult to extract. It is possible to brute-force (guess-and-check) settings of dependent features by changing the settings at-random and checking the results, but this is both time consuming and slow. Although most of the information about feature dependencies is stored on the camera as nodes in a file, such as a markup language file (e.g., Extensible Markup Language (XML), Hypertext Markup Language (HTML), Extensible HyperText Markup Language (XHTML), etc.), it is often impossible for a machine vision application user to decipher the file given the vast number of internal nodes contained in the file that are not meaningful or accessible to them. Accordingly, in various embodiments, the file is parsed, and given a feature of interest, a list of features having settings that could potentially unlock the given feature is presented. Thus, the embodiments help users quickly narrow down the possible settings that are preventing them from editing their feature of interest. The embodiments are capable of handling relationships from simple, direct dependencies to complex, multi-layered chain dependencies while only outputting features that have settings that are meaningful to and accessible by the user, and at the same time, keeping the maintenance of documentation around feature dependencies to a minimum.

Figure 2:
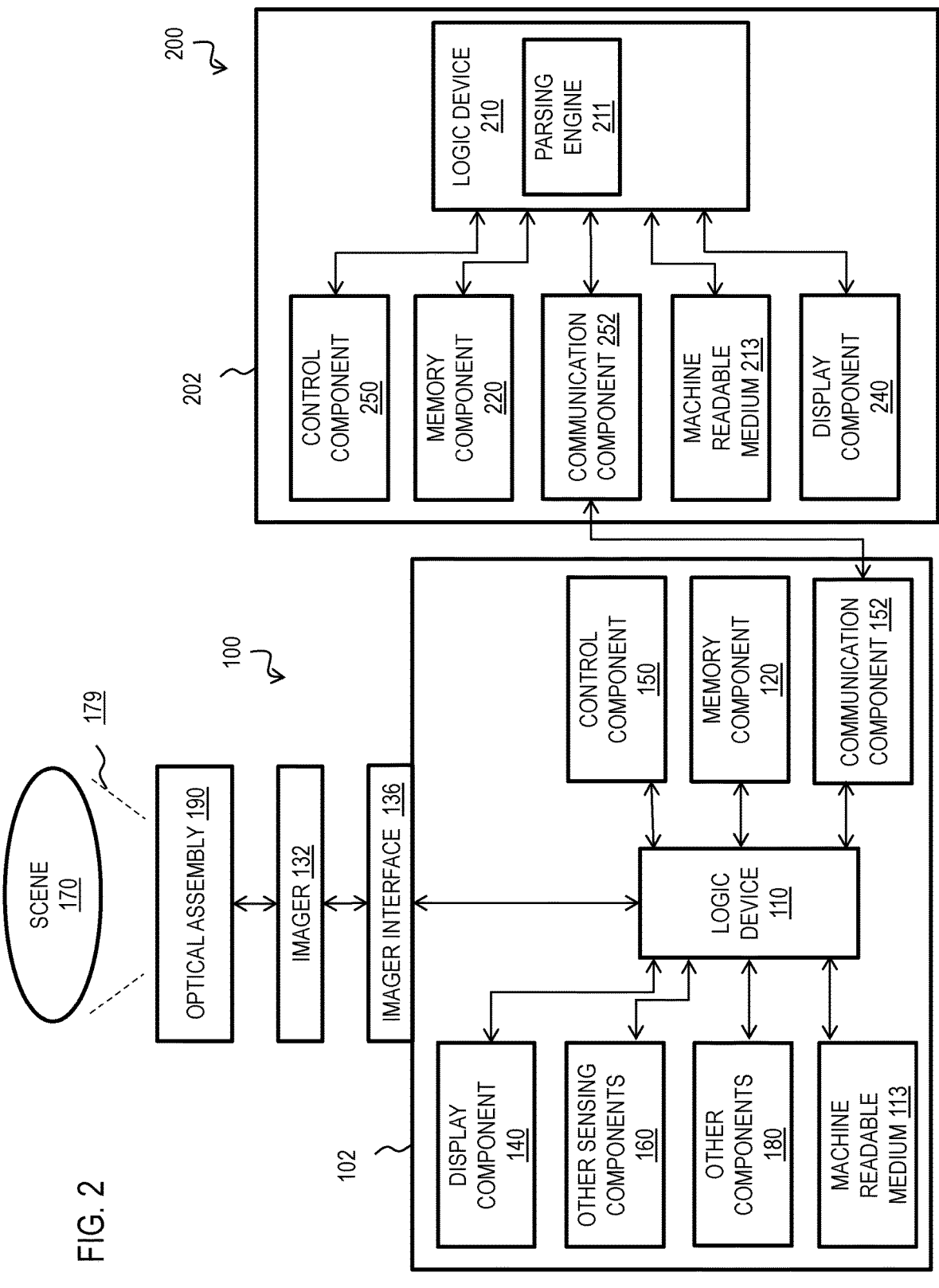
FIG. 2 illustrates a block diagram of an imaging system and a computer system in accordance with an embodiment of the disclosure.

FIG. 2 illustrates a block diagram of imaging system 100 and computer system 200 in accordance with an embodiment of the disclosure. In some embodiments, one or more components of imaging system 100 may be implemented remotely from each other in a distributed fashion (e.g., networked or otherwise).

As shown, imaging system 100 includes an optical assembly 190, an imager 132, an imager interface 136, and housing 102 (e.g., a camera body). Housing 102 includes logic device 110, machine readable medium 113, memory component 120, display component 140, control component 150, communication component 152, other sensing components 160, and other components 180.

In various embodiments, imaging system 100 may be implemented, for example, as a camera system such as a portable handheld camera system, a small form factor camera system implemented as part of another device, a fixed camera system, and/or other appropriate implementations. In various embodiments, imaging system 100 may be handheld or mounted to a vehicle, machinery, walls, etc.

In some embodiments, logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of processing device and/or memory to execute instructions to perform appropriate operations. Logic device 110 is configured to interface and communicate with the various components illustrated in FIG. 1. In various embodiments, it should be appreciated that processing operations and/or instructions may be integrated in software and/or hardware as part of logic device 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is configured to execute software stored in memory component 120 and/or machine readable medium 113 to perform various methods, processes, and operations in a manner as described herein.

In some embodiments, imager 132 may include an array of sensors (e.g., any type visible light, infrared, or other type of detector) for capturing images in response to electromagnetic radiation 179 (e.g., thermal infrared radiation, visible light, and/or other wavelengths) received from scene 170. In one embodiment, the sensors of imager 132 provide for representing (e.g., converting) captured images of scene 170 as digital data (e.g., via an analog-to-digital converter included as part of the sensor or separate from the sensor as a part of imaging system 100). Imager interface 136 provides the captured images to logic device 110 which may be used to process the image frames, store the original and/or processed image frames in memory component 120, and/or retrieve stored image frames from memory component 120.

In some embodiments, logic device 110 may be configured to receive images from imager 132, process the images, store the original and/or processed images in memory component 120, and/or retrieve stored images from memory component 120. In various aspects, logic device 110 may be configured to receive images from imager 132 via wired or wireless communication with imager interface 136. Logic device 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Logic device 110 may be configured to display image data and information on display component 140. Logic device 110 may be configured to retrieve image data and information from memory component 120 and display any retrieved image data and information on display component 140. Display component 140 may include display electronics, which may be utilized by logic device 110 to display image data and information. Display component 140 may receive image data and information directly from imager 132 via logic device 110, or the image data and information may be transferred from memory component 120 via logic device 110.

In some embodiments, control component 150 may include a user input and/or interface device having one or more user actuated components, such as one or more push-buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Logic device 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, imaging system 100 may include one or more other types of sensing components 160, including environmental and/or operational sensors, depending on the sensed application or implementation, which provide information to logic device 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), rotation (e.g., a gyroscope), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by imager 132.

In some embodiments, other sensing components 160 may include devices that relay information to logic device 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a connector (e.g., to interface one or more electronic components to an external device), a network interface controller (NIC) configured for communication with a network including other devices in the network, and/or other implementations. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 180 such as speakers, displays, visual indicators (e.g., recording indicators), vibration actuators, a battery or other power supply (e.g., rechargeable or otherwise), and/or additional components as appropriate for particular implementations.

As shown, computer system 200 includes logic device 210, machine readable medium 213, memory component 220, display component 240, control component 250, and communication component 252. Logic device 210, machine readable medium 213, memory component 220, display component 240, control component 250, and communication component 252 operate in a same or similar manner to logic device 110, machine readable medium 113, memory component 120, display component 140, control component 150, and communication component 152, respectively as previously described.

As shown, logic device 210 of computer system 202 may include a parsing engine 211 implemented, for example, as software instructions executed by logic device 210. As further discussed, parsing engine 211 may perform various operations of the process of FIG. 3 to parse and identify node relationships identified in a file of imaging system 100.

As shown, communication component 152 of imaging system 100 and communication component 252 of computer system 200 may interface with each other (e.g., through connection of a physical cable and/or wirelessly). For example, in some embodiments, imaging system 100 may transmit a file (e.g., a markup language file) stored in memory component 120 and/or machine readable medium 113 over communication component 152 that is received by communication component 252 of computer system 200.

FIG. 3 illustrates a flow diagram of a process 300 for identifying settings of another node associated with a feature of imaging system 100 on which a locked state of the node associated with a given feature is contingent in accordance with an embodiment of the disclosure. For explanatory purposes, process 300 is primarily described herein with reference to imaging system 100 and computer system 200. However, the process 300 is not limited to such implementations.

At block 302, responsive to a user connecting imaging system 100 with computer system 200 via communication components 252 and 152, respectively, logic device 210 of computer system 200 retrieves a file from imaging system 100 identifying a plurality of nodes corresponding to associated features of imaging system 100 as discussed. Each of the nodes in the file has an associated plurality of settings and each of the nodes is configured to be in either an unlocked state to permit adjustment of its associated settings by a user or a locked state to prevent adjustment of its associated settings by the user.

At block 304, logic device 210 receives a request from a user that identifies a node associated with a feature that is in a locked state. Thus, at block 306, parsing engine 211 of logic device 210 parses at least a portion of the file to identify a second one of the nodes. i.e., feature node, having associated settings on which the locked state of the first node is contingent. For example, with reference to FIG. 4 that illustrates an exemplary node file portion of the file associated with a given feature "TriggerSoftware" in accordance with an embodiment of the disclosure, parsing engine 211 identifies the identification of another node, "TriggerSoftware_Lck," that could potentially lock/unlock the given feature. In various embodiments, parsing engine 211 identifies the other node by looking at a node property listed in the file, for example a "pIsLocked" property. While in some embodiments the identified property may point to a feature node whose settings could potentially lock/unlock the given feature, which would then be added to a list of feature nodes whose settings could potentially lock/unlock the given feature, in other embodiments, the identified property may point to one or more internal nodes of various types, and thus, requires further parsing.

An internal node is a node in the file that is not associated with a feature, and thus, not accessible to users from a machine vision application. For example, it is very common for a feature such as "Gamma" to have a corresponding "value node" named something like "Gamma_Val". This helps imaging system developers describe the type of a feature value as well the register address of this feature value on the imaging system. When a property of a node points to a value node, parsing engine 211 traverses parent nodes associated with this value node until a node associated with a feature is identified. The feature node is then added to the output list to be returned to the user.

Another type of internal node that could be listed in the property is a "lock node". Lock nodes are internal nodes aimed to describe a condition that would cause a node to be locked. On exemplary type of lock node is a "swiss knife" node, which allows camera developers to specify a logical formula, using other nodes in the file as variables in the logical formula. Given the endless possible forms a logical formula may take, it might seem very difficult to decipher any given logical formula in a swiss knife node. Fortunately, parsing engine 211 parses the file to identify variable nodes. In various embodiment, parsing engine 211 identifies the variable nodes by looking for a "pInvalidator" property. When a variable node is identified, parsing engine 211 traverses the variable node to identify feature node whose settings could potentially lock/unlock the given feature, which would then be added to a list of features whose settings could potentially lock/unlock the given feature.

Yet another type of internal node that could be listed in the property is a "intermediate node." Intermediate nodes are internal nodes whose values are stored in their own register addresses on the imaging system 100. In this case, the value of one of these lock nodes directly reflects the lock status of other nodes. For these interim nodes, parsing engine 211 identifies conditions that would cause the interim node to change values. These conditions may be identified in the makeup language file associated with these interim nodes as properties, for example, a "pInvalidator" property. Thus, parsing engine 211 retrieves these properties and traverses a dependency tree to identify corresponding feature nodes, which would then be added to a list of features whose settings could potentially lock/unlock the given feature.

Returning to FIG. 4, parsing engine 211 identifies node of "TriggerSoftware_Lck" 402. Parsing engine 211 would then parse a portion of the file associated with "TriggerSoftware_Lck" 402. FIG. 5 illustrates an exemplary node file portion of the file associated with "TriggerSoftware_Lck" 402 in accordance with an embodiment of the disclosure. In this example, parsing engine 211 identifies properties of: "ExposureMode_Val" 502, "TriggerModeAll_Val" 504, "TriggerMode_Val" 506, "TriggerSource_Val" 508, "TriggerModeAcquisitionStart_Val" 510, "TriggerModeFrameStart_Val" 512, and "TriggerModeFrameBurstStart_Val" 514.

As previously described, parsing engine 211 traverses the dependencies of each node of each property in order to identify feature(s) whose setting could potentially lock/unlock the given feature. While not describing each of the portions of file associated with each of properties 502-514, FIGS. 6-8 are provided as examples of dependency traversing. FIG. 6 illustrates an exemplary node file portion of the file associated with "TriggerModeAll_Val" 504 in accordance with an embodiment of the disclosure. In this example, parsing engine 211 identifies "TriggerMode_Val" 602, "TriggerModeAcquisitionStart_Val" 604, "TriggerModeFrameBurst-Start_Val" 606, "TriggerModeFrameBurst-Start_Val" 608, "SequencerMode_Val" 610, and "SequencerSetLoad_Val" 612. FIG. 7 illustrates an exemplary node file portion of the file associated with "TriggerMode_Val" 602 in accordance with an embodiment of the disclosure. In this example, parsing engine 211 identifies "SensorShutter-Mode_Val" 702, "UserSetLoad_Val" 704, "SequencerMode_Val" 706, and "SequencerSetLoad_Val" 708.

Once parsing engine 211 has parsed all dependencies, parsing engine 211 then traverses back up the dependency tree to identify feature nodes associated with those dependencies. FIG. 8 illustrates an exemplary node file portion of the file associated with "TriggerMode" in accordance with an embodiment of the disclosure. By parsing the file, parsing engine 211 identifies the "TriggerMode" 800 as a feature node because "TriggerMode_Val" 802, corresponding to "TriggerMode_Val" 602 identified in FIG. 6, is identified as value node. In order to prevent a cyclical search, parsing engine 211 keeps track of all visited nodes, as well as logic to exclude root nodes which provide no value to the user.

Figure 9:
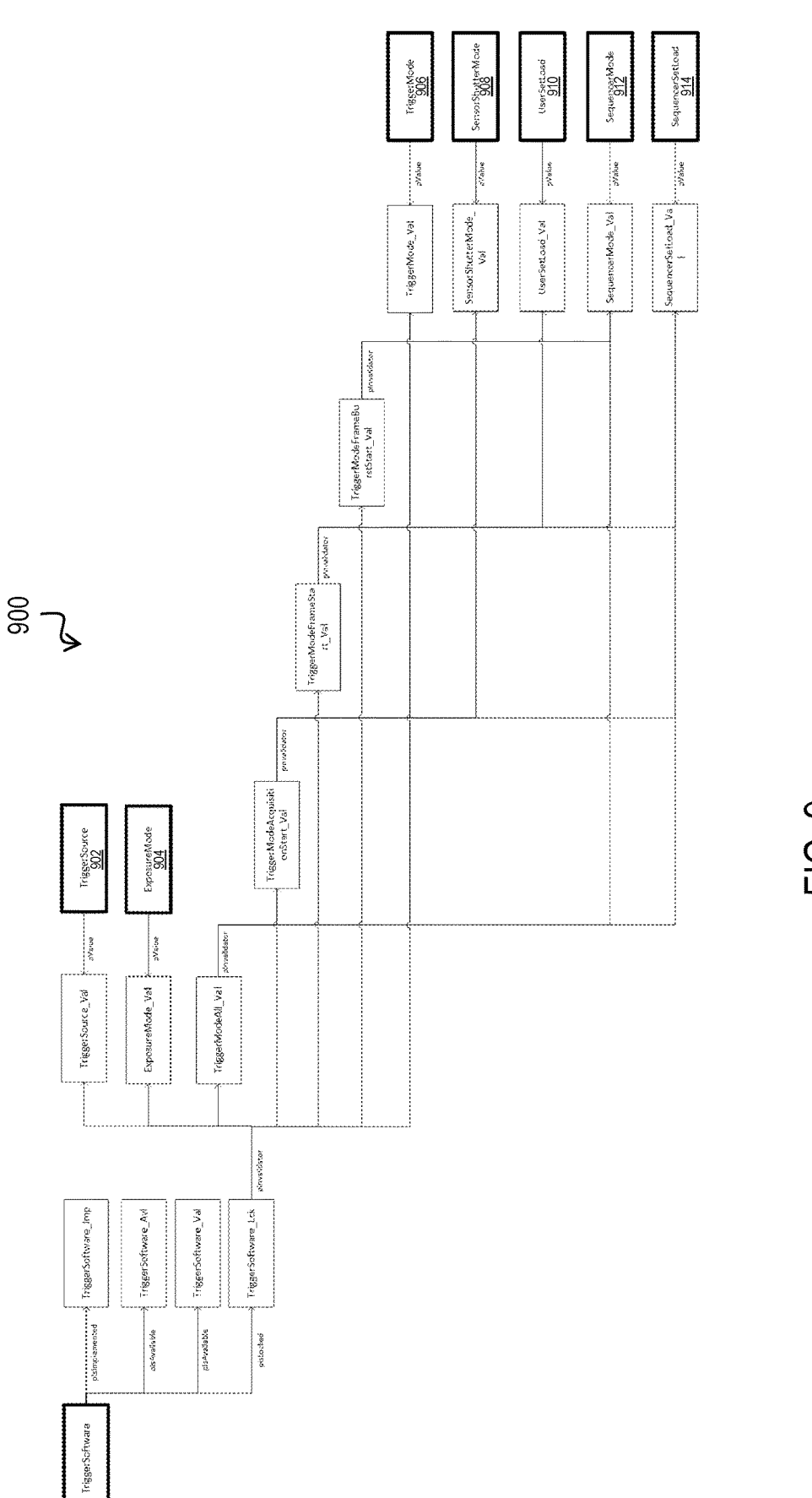
FIG. 9 illustrates a full dependency tree in accordance with an embodiment of the disclosure.

The examples illustrated in FIGS. 4-8 only illustrate a portion of the dependency parsing performed by parsing engine 211. FIG. 9 illustrates a full dependency tree that would be identified in accordance with an embodiment of the disclosure. By traversing through all of the dependency nodes identifying all property values and then identifying all value nodes identified by feature nodes, parsing engine 211 is able to identify feature nodes that could potentially lock/unlock the given feature, i.e. "TriggerSource" 902, "ExposureMode" 904, "TriggerMode" 906, "SensorShutter-Mode" 908, "UserSetLoad" 910, "SequencerMode" 912, and "SequencerSetLoad" 914, each of which are added to a list of features whose settings could potentially lock/unlock the given feature. At block 308, once parsing engine 211 has identified features whose settings could potentially lock/unlock the given feature, logic device 210 presents the associated settings to the user in a graphical user interface via display component 240.

In various embodiments, the graphical user interface may be an interface associated with a type of imaging system being used. For example, the interface may be Generic Application Programming Interface (GenAPI) interface and the nodes may be identified by the file in a Generic Interface for Cameras (GenICam) format. Through one function call, users are provided with a comprehensive list of nodes that may lock/unlock any given feature in the file, on a library level via the graphical user interface. With a click of a button, users are able to find lock dependencies of any given node in real time. The accuracy and completeness of the resulting output list is directly dependent on the accuracy and completeness of the file in the imaging system.

In various embodiments, once logic device 210 presents the associated settings to the user in a graphical user interface via display component 240, the user is able to adjust one or more of the settings in order to unlock the given feature. Therefore, responsive to receiving a user adjustment of at least one of the associated settings of a node associated with a feature, logic device 210 updates the file to switch the first node from the locked state to the unlocked state. This update is performed both on the received file as well as the file in imaging system 100.

Figure 12:
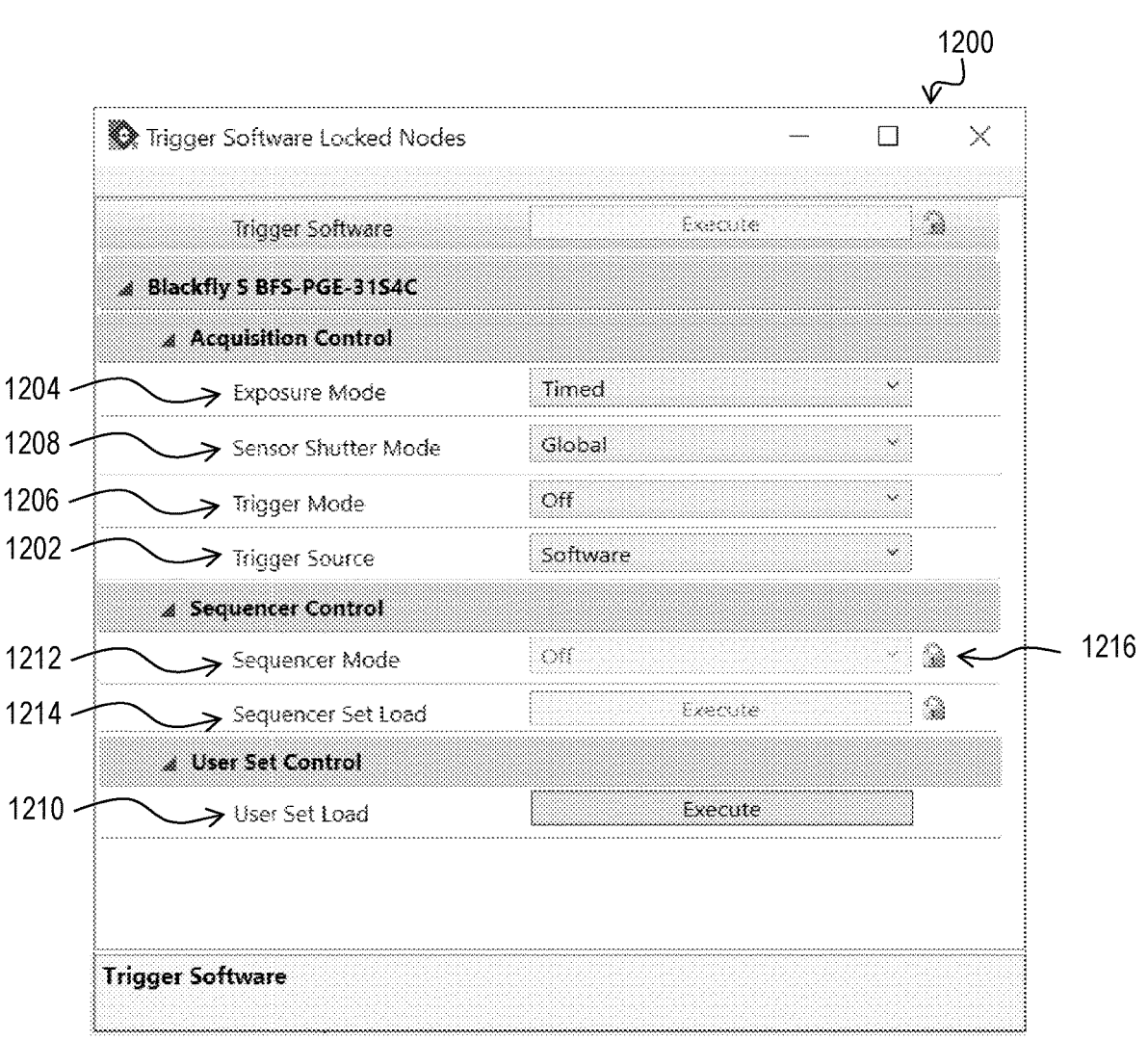
Figure 13:
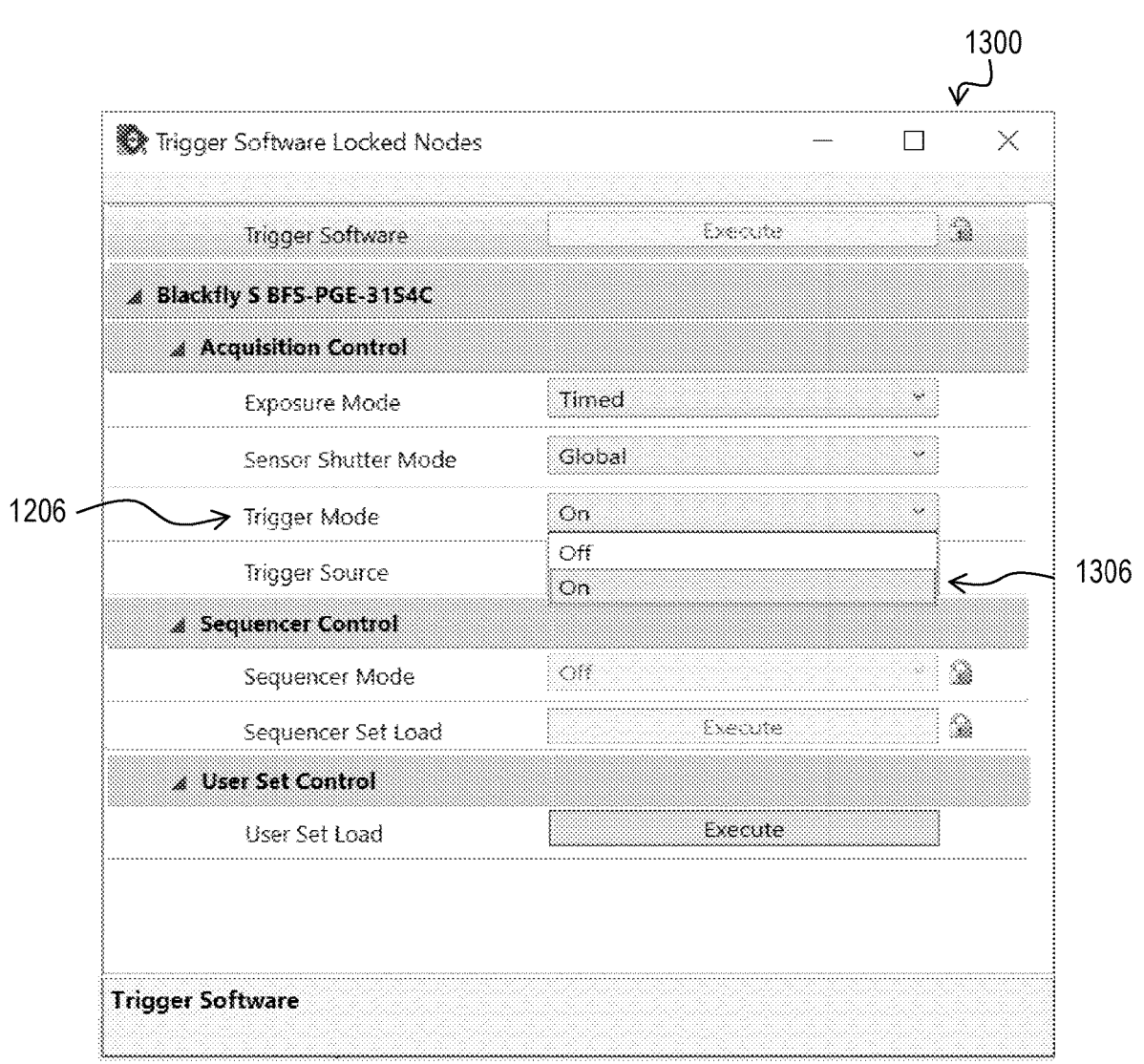

FIGS. 10-14 provide examples of graphical user interfaces that may be provided to the user in accordance with an embodiments of the disclosure. Responsive to a user connecting computer system 200 to imaging system 100 via communication components 252 and 152, respectively, an imaging system list will be provided to the user. FIG. 10 illustrates an imaging system list 1000, from which the user selects imaging system 1002. FIG. 11 illustrates the user navigating to a features tree dialog 1100 and finding a node that is locked, i.e. "Trigger Software" node 1102. By the user selecting the lock icon 1104, associated with block 304 described previously, the process described above with regard to block 306 is triggered, which results in a Locked Nodes dialog being presented to the user. FIG. 12 illustrates one such Lock Nodes dialog 1200. Lock Nodes dialog 1200 lists all associated nodes that potentially locks/unlocks the "Trigger Software" node, i.e. "TriggerSource" 1202, "ExposureMode" 1204, "TriggerMode" 1206, "SensorShutter-Mode" 1208, "UserSetLoad" 1210, "SequencerMode" 1212, and "SequencerSetLoad" 1214, which correspond to the feature nodes identified in FIG. 9. Changing a setting of a specific feature of the listed nodes may then unlock the selected Trigger Software node. The lock icon 1216 beside "Sequencer Mode" 1212 may itself be clicked (or otherwise selected), which would open a new dialog showing the locked-node dependencies of the pertaining node (e.g. the "Sequencer Mode"). This may be repeated any number of times, creating a new dialog for each unique node. In the case of the user selecting a node that has already had a new dialog created, the user may be made aware of the existing dialog by the relevant dialog being brought into focus, instead of a new dialog being opened. FIG. 13 illustrates the user changing a setting 1306 of the Trigger Mode 1206 feature from "Off" to "On" in dialog 1300 Once the specific setting change is applied, the "Trigger Software" node is unlocked as seen in FIG. 14 where the lock icon 1104, previously shown present in FIG. 11 no longer appears in dialog 1400.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
receiving, from a physical device, a file identifying a first node and a second node comprising first settings and second settings for first user-controllable features and second user-controllable features of the device, respectively, wherein each of the nodes is in either an unlocked state to permit adjustment of its settings on the device by a user of the device or a locked state to prevent adjustment of its settings on the device by the user;
receiving a request by the user that identifies the first node in the locked state;
parsing at least a portion of the file to identify the second node and its second settings on which the locked state of the first node is dependent, wherein the parsing comprises traversing dependency relationships between the first node and the second node based on one or more properties of one or more internal nodes, wherein the traversing comprises traversing the one or more internal nodes linked to the first node and the second node to identify one or more settings of one or more user-controllable features of the one or more internal nodes, wherein the one or more settings change the one or more user-controllable features of the one or more internal nodes from a locked state to an unlocked state;
presenting the second settings of the second node to the user to identify a dependency between the locked state of the first node and the second settings of the second node;
receiving a user adjustment of at least one of the second settings of the second node;
transmitting the user adjustment to the physical device, wherein the physical device switches the first node from the locked state to the unlocked state in response to the user adjustment, wherein switching the first node to the unlocked state allows user modification of the first user-controllable features; and
wherein the first and second user-controllable features comprise first adjustable control operations and second adjustable control operations of the device, respectively.

2. The method of claim 1, wherein the file further comprises a third node that determines the dependency between the locked state of the first node and the second settings of the second node.

3. The method of claim 2, wherein the third node does not directly correspond to any user-controllable features of the device, wherein the parsing comprises parsing a tree structure of the file that identifies relationships between the first, second, and third nodes.

4. The method of claim 1, wherein the one or more internal nodes comprise:
a value node;
a logical formula that references the second node; and/or
an intermediate node.

5. The method of claim 1, wherein the device is a camera system, wherein the method is performed by a computer system, and wherein the receiving the file is performed in response to a connection of the camera system to the computer system, and wherein the control operations include focus, brightness, contrast, offset, and/or gain of the camera.

6. The method of claim 1, wherein the file is an Extensible Markup Language (XML) file that identifies the nodes in a GenICam format.

7. The method of claim 1, wherein the settings of the second node are presented to the user in a graphical user interface.

8. The method of claim 7, wherein the graphical user interface identifies the first node as being in the locked state and wherein, responsive to the user adjusting of at least one of the settings of the second node, the graphical user interface identifies the first node as being unlocked.

9. The method of claim 7, wherein, responsive to the user selecting a lock icon associated with the second node, opening, in the graphical user interface, a new dialog showing dependencies associated with the second node.

10. The method of claim 1, wherein the second node excludes a lock node.

11. A system comprising:
a computer system configured to:
receive, from a physical device, a file identifying first and second nodes with first settings and second settings for first user-controllable features and second user-controllable features of the device, respectively, wherein each of the nodes is in either an unlocked state to permit adjustment of its settings on the device by a user of the device or a locked state to prevent adjustment of its settings on the device by the user;
receive a request by the user that identifies the first node in the locked state;
parse at least a portion of the file to identify the second node and its second settings on which the locked state of the first node is dependent, wherein the parsing comprises traversing dependency relationships between the first node and the second node based on one or more properties of one or more internal nodes, wherein the traversing comprises traversing the one or more internal nodes between linked to the first node and the second node to identify one or more settings of one or more user-controllable features of the one or more internal nodes, wherein the one or more settings change the one or more user-controllable features of the one or more internal nodes from a locked state to an unlocked state;

present the second settings of the second node to the user to identify a dependency between the locked state of the first node and the second settings of the second node;

receive a user adjustment of at least one of the second settings of the second node;

transmit the user adjustment to the physical device, wherein the physical device switches the first node from the locked state to the unlocked state in response to the user adjustment, wherein switching the first node to the unlocked state allows user modification of the first user-controllable features; and wherein the first and second user-controllable features comprise first and second adjustable control operations of the device, respectively.

12. The system of claim 11, wherein the file further comprises a third node that determines the dependency between the locked state of the first node and the second settings of the second node.

13. The system of claim 12, wherein the third node does not directly correspond to any user-controllable features of the device, wherein the parsing comprises parsing a tree structure of the file that identifies relationships between the first, second, and third nodes.

14. The system of claim 11, wherein the one or more internal nodes comprise:

a value node;

a logical formula that references the second node; and/or an intermediate node.

15. The system of claim 11, wherein the device is a camera system, wherein the system is a computer system configured to receive the file in response to a connection of the camera system to the computer system, and wherein the control operations include focus, brightness, contrast, offset, and/or gain of the camera.

16. The system of claim 11, wherein the file is an Extensible Markup Language (XML) file that identifies the nodes in a GenICam format.

17. The system of claim 11, wherein the settings of the second node are presented to the user in a graphical user interface.

18. The system of claim 17, wherein the graphical user interface identifies the first node as being in the locked state and wherein, responsive to the user adjusting of at least one of the settings of the second node, the graphical user interface identifies the first node as being unlocked.

19. The system of claim 17, wherein, responsive to the user selecting a lock icon associated with the second node, opening, in the graphical user interface, a new dialog showing dependencies associated with the second node.

20. The system of claim 11, wherein the second node excludes a lock node.

* * * * *